US007800622B2

(12) United States Patent
Schindler et al.

(10) Patent No.: US 7,800,622 B2
(45) Date of Patent: Sep. 21, 2010

(54) METHOD AND APPARATUS FOR SELECTIVE ACCESS OF DISPLAY DATA SEQUENCING IN MOBILE COMPUTING DEVICES

(75) Inventors: Jon Schindler, Glenview, IL (US); Irfan Nasir, Lake in the Hills, IL (US)

(73) Assignee: Motorola, Inc., Schaumburg, IL (US)

( * ) Notice: Subject to any disclaimer, the term of this patent is extended or adjusted under 35 U.S.C. 154(b) by 853 days.

(21) Appl. No.: 11/689,436

(22) Filed: Mar. 21, 2007

(65) Prior Publication Data

US 2008/0234005 A1 Sep. 25, 2008

(51) Int. Cl.

| | |
|---|---|
| ***G06F 13/00*** | (2006.01) |
| ***G06F 17/00*** | (2006.01) |
| ***G09G 5/36*** | (2006.01) |
| ***G06T 15/00*** | (2006.01) |
| ***G05B 19/18*** | (2006.01) |
| ***G05B 11/01*** | (2006.01) |
| ***H04B 1/02*** | (2006.01) |
| *H04B 1/034* | (2006.01) |
| *H04M 1/00* | (2006.01) |
| *G06F 15/00* | (2006.01) |

(52) U.S. Cl. ........................ 345/538; 345/553; 345/901; 345/522; 715/200; 715/273; 700/1; 700/7; 700/11; 700/17; 712/25; 455/566; 455/91; 455/95

(58) Field of Classification Search ................. 345/619, 345/520, 522, 538, 553, 901–903; 700/1, 700/7, 11, 17; 712/1, 8, 21–22, 25, 200, 712/220; 715/200, 273; 455/566, 91, 95
See application file for complete search history.

(56) References Cited

U.S. PATENT DOCUMENTS 6,097,352 A 8/2000 Zavracky et al.

(Continued)

FOREIGN PATENT DOCUMENTS

KR 10-2005-0120428 A 12/2005

(Continued)

OTHER PUBLICATIONS

International Search Report Issued Jun. 19, 2008, in connection with related PCT Application No. PCT/US2008/055987.

(Continued)

*Primary Examiner*—Wesner Sajous

(57) ABSTRACT

A method and apparatus for selective control of display data sequencing in a mobile computing device is disclosed. The method may include storing a plurality of display data sequencing instruction sets in a memory of the mobile computing device, each of the display data sequencing instruction sets being usable for transferring data in accordance with a different sequencing of display data than other ones of the display data sequencing instruction sets, receiving an indication of a particular type of display data sequencing to be used, selecting one of the display data sequencing instruction sets based on the received indication of the particular type of display data sequencing to be used, transferring data for display based on the selected one of the display data sequencing instruction sets, and controlling the transfer of data to the display device in order to synchronize the data transfer with the data and timing requirements of the display device.

21 Claims, 4 Drawing Sheets

U.S. PATENT DOCUMENTS

| | | | | |
|---|---|---|---|---|
| 6,696,920 | B1 * | 2/2004 | Goodwin et al. | 340/5.91 |
| 6,750,876 | B1 | 6/2004 | Atsatt et al. | |
| 6,819,334 | B1 * | 11/2004 | Owada et al. | 345/659 |
| 6,856,303 | B2 * | 2/2005 | Kowalewski | 345/31 |
| 6,891,545 | B2 | 5/2005 | Dean | |
| 2002/0135541 | A1 * | 9/2002 | Kowalewski | 345/31 |
| 2005/0001826 | A1 | 1/2005 | Sono et al. | |
| 2005/0140930 | A1 | 6/2005 | Dvorkis et al. | |
| 2005/0152012 | A1 | 7/2005 | Nambudiri et al. | |
| 2008/0007498 | A1 * | 1/2008 | Yu et al. | 345/82 |

FOREIGN PATENT DOCUMENTS

| | | | |
|---|---|---|---|
| KR | 10-2006-0032259 | A | 4/2006 |

OTHER PUBLICATIONS

Nora Lindner, "Corresponding Application PCT/US2008/055987—PCT International Preliminary Report on Patentability," The International Bureau of WIPO, Geneva, Switzerland, Oct. 1, 2009, 6 pages, most relevant pp. 2, 5-6.

* cited by examiner

METHOD AND APPARATUS FOR SELECTIVE ACCESS OF DISPLAY DATA SEQUENCING IN MOBILE COMPUTING DEVICES

BACKGROUND OF THE INVENTION

1. Field of the Invention

The invention relates to mobile computing devices, and in particular, to selective access of display data sequencing in such a mobile computing device.

2. Introduction

Mobile computing devices, such as cellular phones, handheld computers, MP3 players, laptop computers, etc. are very pervasive computing devices. The mobile computing devices provide various features, such as communications, computing features, Internet access, playing music or video, etc. Such mobile computing devices will often include a display, such as an LCD (liquid crystal display).

New applications are being developed for such mobile computing devices. It may be desirable to provide the mobile computing devices with the ability to display images on an alternate display device, either contained within the device or separate from a display provided as part of mobile computing device, or perhaps even when the mobile computing device does not include a display. For example, it may be desirable to provide a projection display or eyewear display as an accessory or add-on feature with a mobile communication device, such as a cellular phone or a laptop.

However, the standard display interface typically employed by such a mobile computing device is typically configured to support an LCD type of display that is often included with the mobile computing device. It may be desirable to use a non-LCD type display with the mobile computing device. Such non-LCD type displays will often require different sequencing of data, which may make the non-LCD type display incompatible with the display interface provided with the typical mobile communication device.

SUMMARY OF THE INVENTION

A method and apparatus for selective access of display data sequencing in a mobile computing device to support different types of display devices is disclosed. The method may include storing a plurality of display data sequencing instruction sets in a memory of the mobile computing device, each of the display data sequencing instruction sets being usable for transferring data to the display device in accordance with a different sequencing of display data than other ones of the display data sequencing instruction sets, receiving an indication of a particular type of display device or display data sequencing to be used, selecting one of the display data sequencing instruction sets based on the received indication of the particular type of display device or display data sequencing to be used, transferring data for display based on the selected one of the display data sequencing instruction sets, and controlling the transfer of data to the display device in order to synchronize the data transfer with the timing needs of the display device.

BRIEF DESCRIPTION OF THE DRAWINGS

In order to describe the manner in which advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
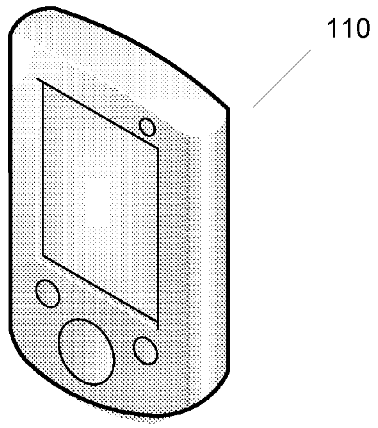
FIG. 1 illustrates an exemplary diagram of a mobile computing device in accordance with a possible embodiment of the invention.

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Various embodiments of the invention are discussed in detail below. While specific implementations are discussed, it should be understood that this is done for illustration purposes only. A person skilled in the relevant art will recognize that other components and configurations may be used without departing from the spirit and scope of the invention.

The invention comprises a variety of embodiments, such as a method and apparatus and other embodiments that relate to the basic concepts of the invention.

In a typical mobile computing device, an LCD display is often used to display user interface information and visual content such as video, images, text, etc. For example, cellular phones, handheld computers and other mobile computing devices often come equipped with an LCD display. Data is transferred to a standard LCD following a Line-by-Line sequencing of data, where a first line of data is transferred starting with the data from one edge of the display and proceeding along the line to the data at the opposite edge, followed by a second line of data and so forth, typically from top to bottom and from left to right on the LCD display. Accordingly, such a typical mobile computing device will be equipped with data sequencing programming to support this Line-by-Line sequencing of data. Typically, these data transfer operations are supported by a Direct Memory Access (DMA) controller element in the processor. These types of sequencing of data transfer and DMA controllers are well known to those of ordinary skill in the art.

However, the invention provides for display data sequencing of a variety of types in a mobile computing device. These types may include a Color Sequential data sequencing type, a Line Reversal data sequencing type, a Line and Frame Reversal data sequencing type, a Display Scaling sequencing type, and a Tiled Display sequencing type, as well as a Line-by-Line data sequencing type. These types are examples and not limiting. This allows the invention to support display data sequencing of various types to allow a non-LCD type display to display data in association with the mobile computing device. For example, an eyewear display, projector display, or other type of non-LCD display may be associated with a mobile computing device to display images. The invention determines the type of sequencing needed for the associated display, performs the data transfer according to the needed type of sequencing so that images may be displayed properly, and synchronizes the data transfer with the display device.

FIG. 1 illustrates an exemplary diagram of a mobile computing device 110 in accordance with a possible embodiment of the invention. The mobile computing device 110 may be any mobile or portable computing device, including a mobile telephone, cellular telephone, a wireless radio, a portable computer, a laptop, an MP3 player, satellite radio, satellite television, Digital Video Recorder (DVR), television set-top box, etc.

Figure 2:
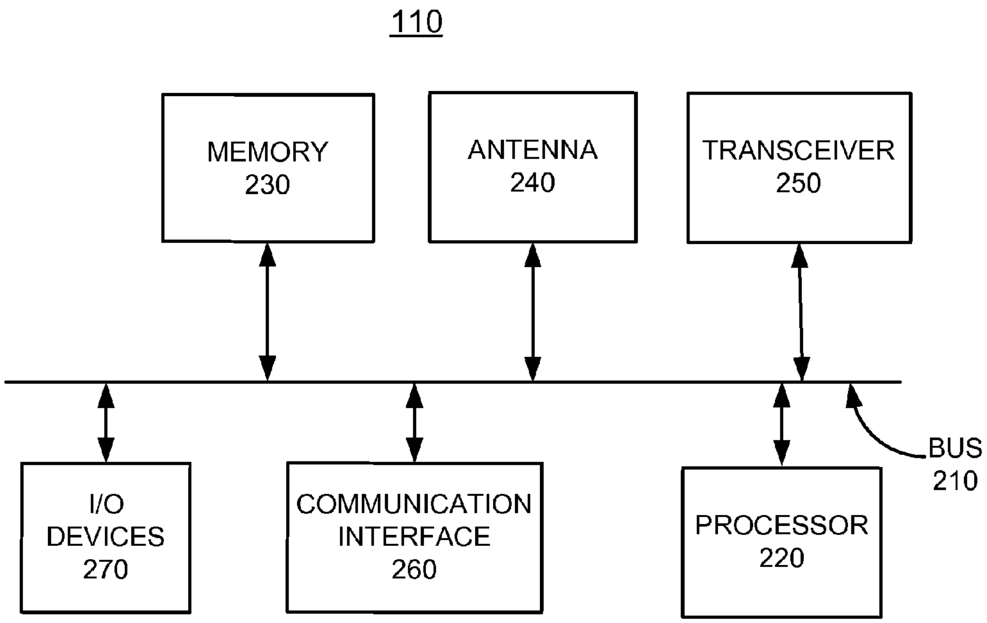
FIG. 2 illustrates a block diagram of an exemplary mobile computing device in accordance with a possible embodiment of the invention.

FIG. 2 illustrates a block diagram of an exemplary mobile computing device 110 in accordance with a possible embodiment of the invention. The exemplary mobile computing device 110 may include a bus 210, a processor 220, and a memory 230. The bus 210 may permit communication among the components of the mobile communication device 110. The mobile computing device 110 may include other optional elements such as an antenna 240, a transceiver 250, a communication interface 260, and input/output (I/O) devices 270, although these elements may not be necessary to practice the invention.

Processor 220 may include at least one conventional processor or microprocessor that interprets and executes instructions. Memory 230 may be a random access memory (RAM or another type of dynamic storage device that stores information and instructions for execution by processor 220. Memory 230 may also include a read-only memory (ROM which may include a conventional ROM device or another type of static storage device that stores static information and instructions for processor 220.

Transceiver 240 may include one or more transmitters and receivers. The transceiver 240 may include sufficient functionality to interface with any network or communication station and may be defined by hardware or software in any manner known to one of skill in the art. The processor 220 is cooperatively operable with the transceiver 240 to support operations within the network.

Input/output devices I/O devices) may include one or more conventional input mechanisms that permit a user to input information to the mobile communication device 110, such as a microphone, touchpad, keypad, keyboard, mouse, pen, stylus, voice recognition device, buttons, etc. Output devices 270 may include one or more conventional mechanisms that output information to the user, including a display, one or more speakers, a storage medium, such as a memory, magnetic or optical disk, disk drive, and printer, etc., and/or interfaces for the above. The display may typically be an LCD display as used on many conventional mobile computing devices.

Additionally, as mentioned above, the mobile computing device 110 may include or have associated with it a non-LCD type display, functioning as an output device 270. This non-LCD display may be built into the device in addition to an LCD display, or may be added to the mobile computing device prior to or after purchase of the mobile computing device by the consumer. In any case, the invention will interact with the display in order to determine the appropriate type of data sequencing needed for the display. The programming necessary to accomplish this functionality may be stored in the memory of the mobile computing device at the time of manufacture, or may be loaded into the memory at a later time.

The mobile computing device 110 may perform functions in response to processor 220 by executing sequences of instructions or instruction sets contained in a computer-readable medium, such as, for example, memory 230. Such instructions may be read into memory 230 from another computer-readable medium, such as a storage device or from a separate device via a communication interface.

The memory 230 may store a plurality of display data sequencing instruction sets, each of the display data sequencing instruction sets being usable for transferring data in accordance with a different sequencing of display data than other ones of the display data sequencing instruction sets. For example, the display data sequencing instruction sets may be a Color Sequential data sequencing type, a Line Reversal data sequencing type, a Line and Frame Reversal data sequencing type, a Display Scaling data sequencing type, and a Tiled Display data sequencing type, as well as a Line-by-Line data sequencing type.

The processor 220 may receive an indication of a particular type of data sequencing. For example, the processor 220 typically may receive the indication of a particular type of display device to be used. The processor 220 may receive this indication in any manner, such as sending a request and receiving a response from the display device, receiving a user input from an input device 270, or any other way of receiving the indication. When the type of display is received, the processor 220 may determine the appropriate type of display data sequencing needed for the type of display. The processor 220 then selects the appropriate type of data sequencing from the instruction sets stored in the memory 230 based on the received indication. The processor 220 will then cause data transfer to the display based on the selected type of data sequencing. The processor 220 may control the data sequencing or it may direct another entity, such as a DMA controller, to execute the desired data transfer according to the selected display data sequencing.

The mobile computing device 110 illustrated in FIGS. 1-2 and the related discussion are intended to provide a brief, general description of a suitable communication and processing environment in which the invention may be implemented. Although not required, the invention will be described, at least in part, in the general context of computer-executable instructions, such as program modules, being executed by the mobile computing device 110, such as a mobile telephone, or a television set-top box. Generally, program modules include routine programs, objects, components, data structures, etc. that perform particular tasks or implement particular abstract data types. Moreover, those skilled in the art will appreciate that other embodiments of the invention may be practiced in communication network environments with many types of communication equipment and computer system configurations, including cellular devices, mobile communication devices, personal computers, hand-held devices, multi-processor systems, microprocessor-based or programmable consumer electronics, and the like.

Figure 3:
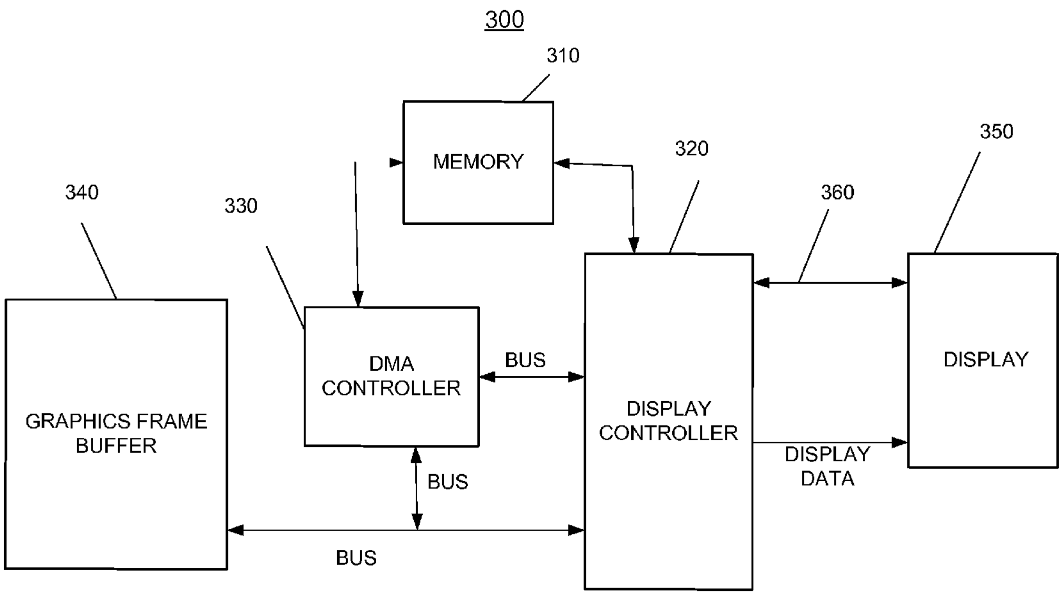
FIG. 3 illustrates an exemplary block diagram of an exemplary mobile computing device in accordance with a possible embodiment of the invention.

FIG. 3 illustrates an exemplary block diagram of system 300 of a mobile computing device in accordance with a possible embodiment of the invention. The system 300 may include a memory 310, a DMA controller 320, a graphics frame buffer 330, and a display controller 340. These system elements may be separate entities in the system or they may reside together, partially or fully, within a processor. The system 300 may be connected to a display 350. The display 350 may be a non-LCD display, and may be an eyewear display or a projection display, for example.

The memory 310 stores a plurality of display data sequencing instruction sets, each of the display data sequencing instruction sets being usable for transferring data in accordance with a different sequencing of display data according to the requirements of the display 350.

The display controller 320 sends and receives control signals 360 to and from the display 350. The control signals 360 received from the display 350 may include a signal indicative of the type of display and/or type of display data sequencing needed for the display 350. Based on this received control signal 360, the display controller 320 will access the appropriate display data sequencing instruction set in the memory 310, which can be forwarded to the DMA controller 330 to direct the data transfer process with the proper data sequencing for the display 350.

The graphics frame buffer 340 will have stored therein data to be displayed. The DMA controller 330 will cause transfer of the display data from the graphics frame buffer 340 to the display controller 320 according to the selected data sequencing instruction set. The properly sequenced data will then be forwarded to the display 350 over the display data bus for display.

As indicated above, the display data sequencing instruction sets may include various sequencing types such as a Color Sequential data sequencing type, a Line Reversal data sequencing type, a Line and Frame Reversal data sequencing type, a Display Scaling data sequencing type, and a Tiled Display data sequencing type, as well as a Line-by-Line data sequencing type.

Figure 4:
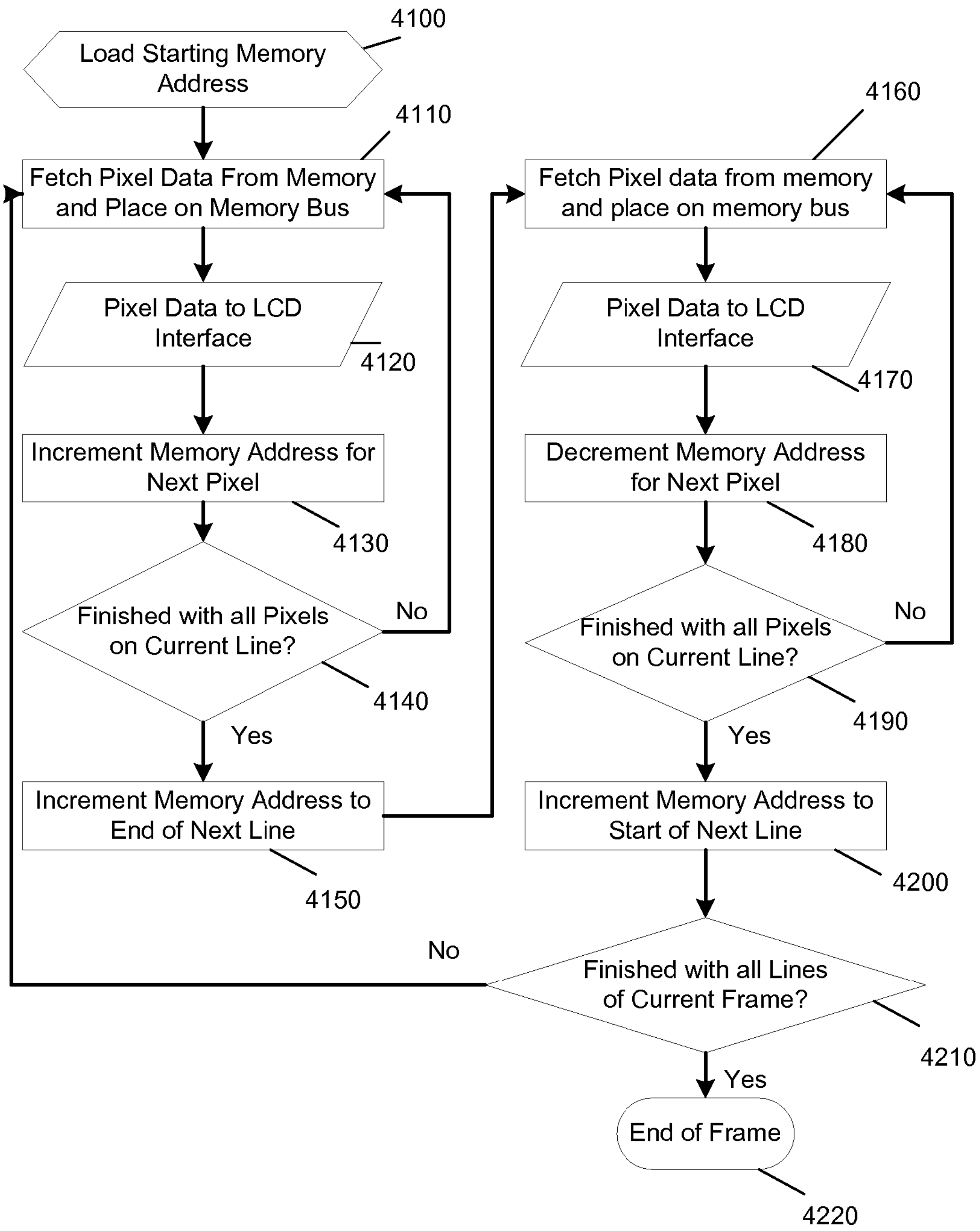
FIG. 4 illustrates an exemplary flow diagram of an exemplary display data sequence in accordance with a possible embodiment of the invention.

FIG. 4 illustrates an exemplary flow diagram of an exemplary display data sequence in accordance with a possible embodiment of the invention to support a Line Reversal data sequencing type. The data sequencing instructions direct the transfer of display data from the graphics frame buffer 340 to the display 350. In this example, the data transfer sequence begins at step 4100 by loading the starting memory location with the address of the first pixel, located within the graphics frame buffer 340, into the DMA controller 330. In step 4110, the DMA controller 330 then fetches the first pixel data from the graphics frame buffer 340 and in step 4120 delivers this display data to the display 350 through the display controller 320. In step 4130, the memory location is incremented to point to the next pixel data and the display data transfer proceeds in this manner to deliver all pixel data for the first line of the display 350, as shown in 4140, until the DMA controller 330 determines that it has reached the end of the line in step 4150.

In step 4160, the display data sequence will then proceed to transfer the pixel data of the next line in reverse order compared to the previous line. Thus the DMA controller is incremented to the memory address of the last pixel location of the line in memory as the starting location for the data transfer. The DMA controller 330 then fetches the pixel data from the graphics frame buffer 340 and delivers this display data to the display 350 through the display controller 320 in step 4170. In step 4180, the memory location is decremented to point to the next pixel data and the display data transfer proceeds in this manner to deliver all pixel data for the next line of the display 350 until the DMA controller 330 determines that it has reached the start of the line in step 4190. In step 4200, the memory location is incremented to the start of the next line.

For each subsequent line of data the data sequencing reverses the sense of the fetching of pixel data as described above, alternating between incrementing through the memory locations and decrementing through them. At the end of each set of lines transferred, in step 4210, the DMA controller 330 determines whether it has reached the end of the data for the current frame, at which point it returns to the starting point, or else it continues with the next line of the current frame. The end of frame is reached in 4220.

During the data transfer process, the display 350 may send control signals 360 to the display controller in order to manage the flow of data. These signals may indicate that the display 350 requires more data or they may indicate that the display 350 is not yet ready for new data. The display controller 320 may act on these control signals 360 to manage the data transfer or the control signals 360 may pass through to the DMA controller 330 and manage its operation directly to trigger a new data transfer or to delay a data transfer. In either case, the display 350 may govern the data transfer in order to synchronize the arrival of data with the data and timing requirements of the display 350.

The invention thus allows different types of displays having different data sequencing requirements to be associated with the mobile computing device. By selecting the appropriate data sequencing instruction set from those stored in the memory 310, the invention enables display data sequencing of various types to occur in a mobile computing device to meet the requirements of the display 350.

Figure 5:
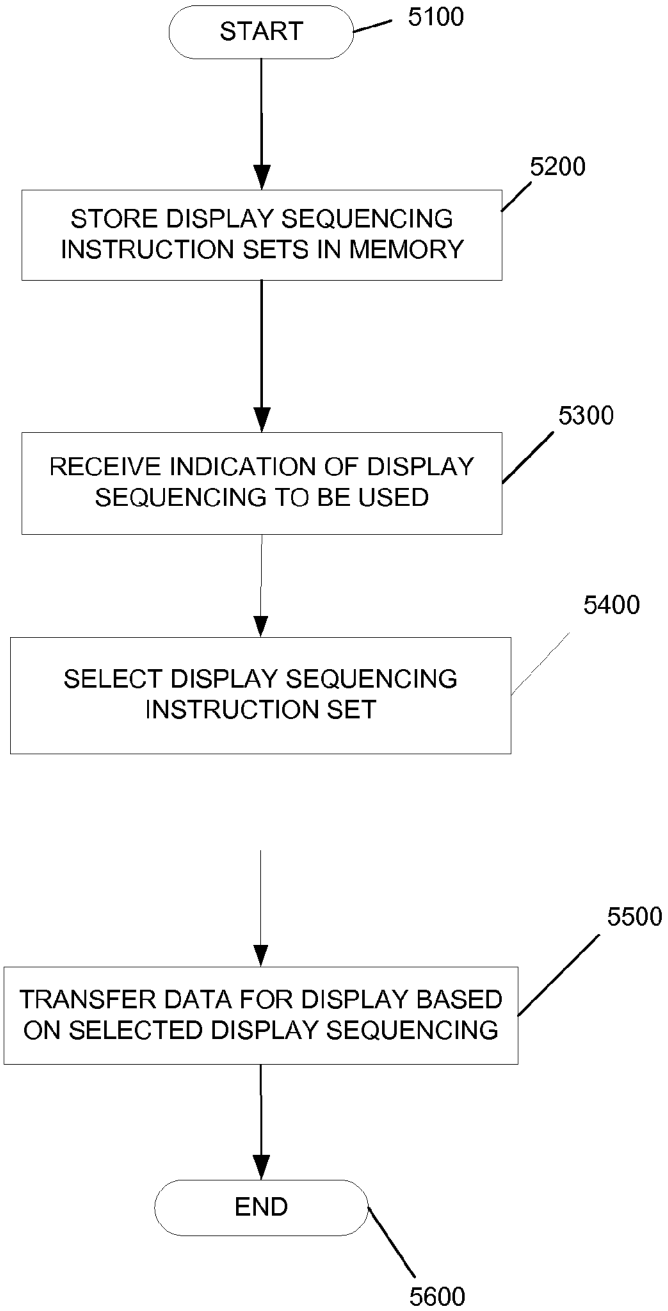
FIG. 5 is an exemplary flowchart illustrating one possible selective access of display data sequencing in a mobile computing device in accordance with one possible embodiment of the invention.

FIG. 5 is an exemplary flowchart illustrating one possible selective access of display data sequencing in accordance with a possible embodiment of the invention. The process starts at 5100. At 5200, a plurality of display data sequencing instruction sets is stored in a memory 230 of the mobile computing device. Each of the display data sequencing instruction sets is usable for sequencing data in accordance with a different sequencing of display data than other ones of the display data sequencing instruction sets. These instruction sets may be stored in the memory 230 in advance of operation of the system, such as when the system is programmed, or an instruction set could be stored during operation, possibly as part of a communication with the display 270.

In step 5300, an indication of a particular type of display data sequencing to be used is received. For example, the processor 220 typically may receive the indication of a particular type of display data sequencing to be used. The processor 220 may receive this indication in any manner, such as receiving an indication from the display, a user input, or any other way of receiving the indication.

In step 5400, the appropriate display data sequencing instruction set is selected based on the received indication of a particular type of display data sequencing to be used. The memory 230 may typically have stored therein the display data sequencing instruction sets along with an indication for each display data sequencing instruction set of the particular type of display and/or display data sequencing corresponding thereto. However, any method allowing the indicated or determined type of display data sequencing to be selected will function with the invention.

In step 5500, the processor 220 causes sequencing of data to the display based on the selected instruction set. This allows the proper sequencing of data no matter what type of display is used, so that the data can be displayed properly. The process goes to step 5600, and ends.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the invention are part of the scope of this invention. Accordingly, the appended claims and their legal equivalents should only define the invention, rather than any specific examples given.

We claim:

1. A method for selective control of display data sequencing in a mobile computing device, comprising:

storing a plurality of display data sequencing instruction sets in a memory of the mobile computing device, each of the display data sequencing instruction sets being usable for transferring display data in accordance with a different type of sequencing of display data than other ones of the display data sequencing instruction sets;

receiving an indication of a particular type of display data sequencing to be used;

selecting one of the display data sequencing instruction sets based on the received indication of the particular type of display data sequencing to be used;

transferring data for display based on the selected one of the display data sequencing instruction sets; and controlling the transfer of data to the display device in order to synchronize the data transfer with data and timing requirements of the display device.

2. The method of claim 1, wherein the indication of a particular type of display data sequencing to be used is received from a display device.

3. The method of claim 2, wherein the display device is physically separate from the mobile computing device.

4. The method of claim 2, wherein the display device is a non-LCD display device.

5. The method of claim 2, wherein the display device is a projection display device.

6. The method of claim 2, wherein the display device is an eyewear display device.

7. The method of claim 1, wherein the mobile computing device is one of a mobile telephone, cellular telephone, a wireless radio, a portable computer, a laptop, an MP3 player, a satellite radio, a satellite television, a Digital Video Recorder (DVR), and a television set-top box.

8. The method of claim 1, wherein the particular type of display data sequencing is one of a Color Sequential data sequencing type, a Line Reversal data sequencing type, a Line and Frame Reversal data sequencing type, a Display Scaling data sequencing type, a Tiled Display data sequencing type, and a Line-by-Line data sequencing type.

9. An apparatus for selective access of display data sequencing in a mobile computing device, comprising:

a memory that stores a plurality of display data sequencing instructions sets, each of the display data sequencing instruction sets being usable for transferring display data in accordance with a different type of sequencing of display data than other ones of the display data sequencing instruction sets; and a processor that receives an indication of a particular type of display data sequencing to be used, selects one of the display data sequencing instruction sets based on the received indication of the particular type of display data sequencing to be used, and causes transfer of data for display based on the selected one of the display data sequencing instruction sets.

10. The apparatus of claim 9, wherein the indication of a particular type of display data sequencing to be used is received from a display device.

11. The apparatus of claim 10, wherein the display device is physically separate from the mobile computing device.

12. The apparatus of claim 10, wherein the display device is a non-LCD display device.

13. The apparatus of claim 10, wherein the display device is a projection display device.

14. The apparatus of claim 10, wherein the display device is an eyewear display device.

15. The apparatus of claim 9, wherein the mobile computing device is one of a mobile telephone, cellular telephone, a wireless radio, a portable computer, a laptop, an MP3 player, a satellite radio, a satellite television, a Digital Video Recorder (DVR), and a television set-top box.

16. A mobile computing device, comprising:

a memory that stores a plurality of display data sequencing instructions sets, each of the display data sequencing instruction sets being usable for sequencing display data in accordance with a different type of sequencing of display data than other ones of the display data sequencing instruction sets; and a processor that receives an indication of a particular type of display data sequencing to be used, selects one of the display data sequencing instruction sets based on the received indication of the particular type of display data sequencing to be used, and causes sequencing of data for display based on the selected one of the display data sequencing instruction sets.

17. The mobile computing device of claim 16, wherein the indication of a particular type of display data sequencing to be used is received from a display device.

18. The mobile computing device of claim 17, wherein the display device is a non-LCD display device.

19. The mobile computing device of claim 17, wherein the display device is a projection display device.

20. The mobile computing device of claim 17, wherein the display device is an eyewear display device.

21. The mobile computing device of claim 16, wherein the mobile computing device is one of a mobile telephone, cellular telephone, a wireless radio, a portable computer, a laptop, an MP3 player, a satellite radio, a satellite television, a Digital Video Recorder (DVR), and a television set-top box.

* * * * *